June 28, 1927.
T. A. JONES
POWER TAKE-OFF
Filed Feb. 25, 1926
1,633,814
2 Sheets-Sheet 1
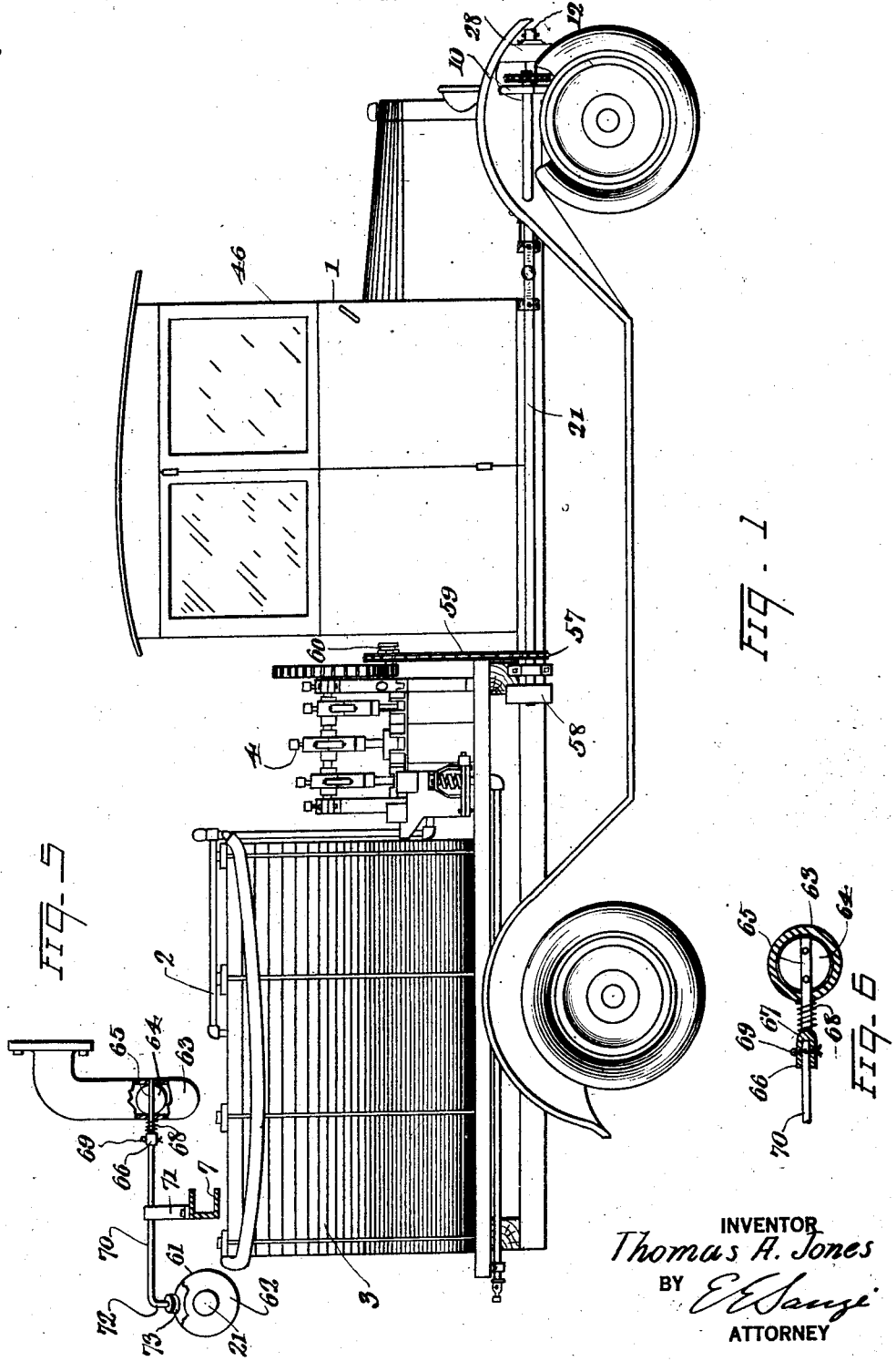
INVENTOR
Thomas A. Jones
BY
ATTORNEY

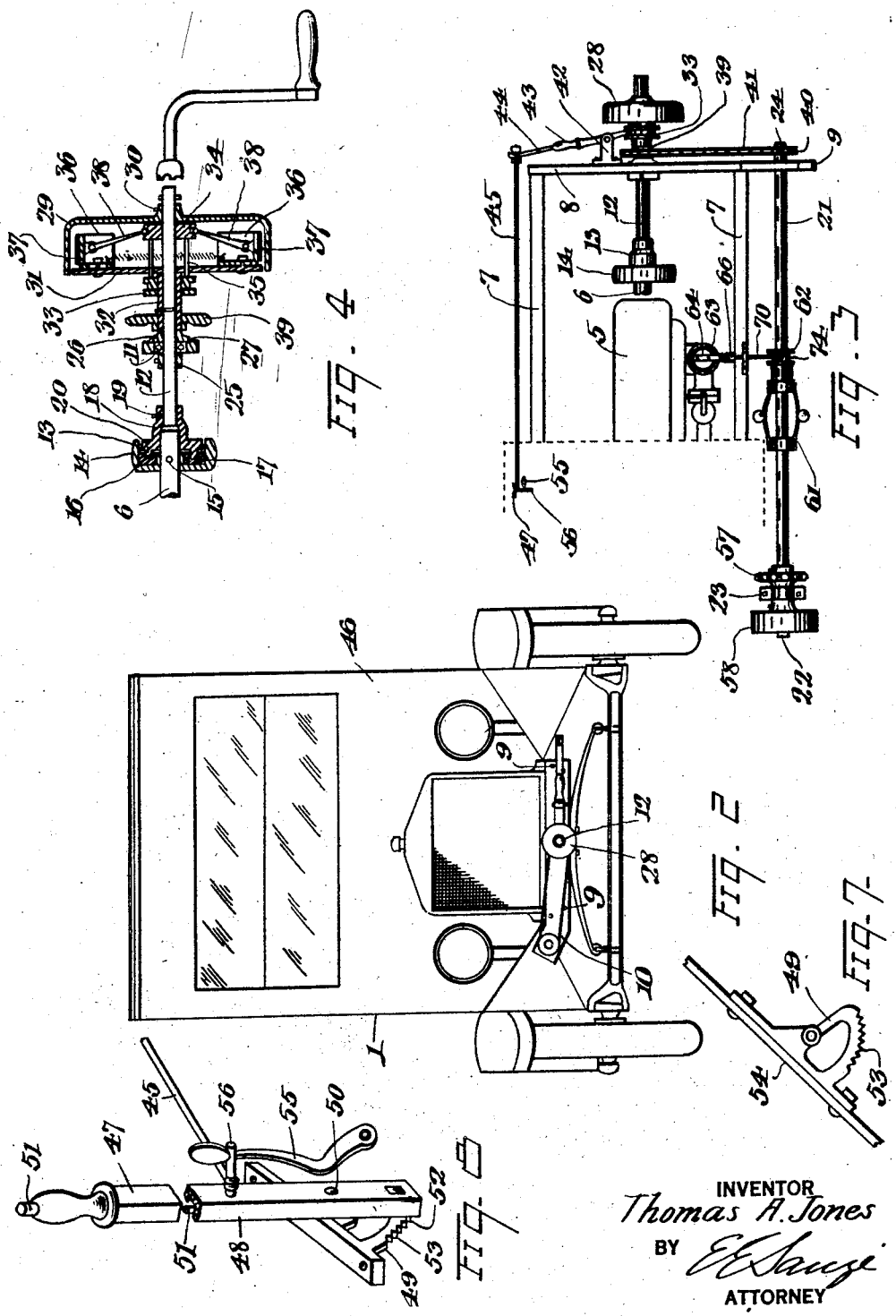

Patented June 28, 1927.

1,633,814

UNITED STATES PATENT OFFICE.

THOMAS A. JONES, OF WALLA WALLA, WASHINGTON.

POWER TAKE-OFF.

Application filed February 25, 1926. Serial No. 90,467.

This invention relates to power take off mechanisms and has as one of its objects to provide a mechanism that is adaptable to power plants, chiefly those used for driving automobiles.

Another object of this invention is to provide a mechanism that may be readily attached to automobile engines and by which power may be transmitted to other mechanisms.

A further object of this invention is to provide a power take off mechanism that may be attached to an automobile engine and which may be operated as the automobile moves.

A further object of this invention is to provide a power take off mechanism having a clutching mechanism operable from the cab of an automobile.

A further object of this invention is to provide a power take off mechanism having a clutching mechanism arranged for co-operation with the controls of an automobile to which it is attached.

A further object of this invention is to provide a power take off mechanism having a simple governor means that will regulate the speed of the mechanism, or the speed of the mechanism and car.

With these and other objects in view reference is now had to the accompanying drawings in which Fig. 1 is a side elevation of an automobile, arranged to carry a spray outfit, and showing the location of the shaft of the power take off mechanism.

Fig. 2 is a front view thereof;

Fig. 3 is a plan view of the mechanism;

Fig. 4 is a sectional elevation of the clutching and attaching means;

Fig. 5 is a side elevation of the governing means;

Fig. 6 is a side elevation of the butterfly valve and coupling;

Fig. 7 is a side view of a quadrant; and

Fig. 8 is a perspective view of the clutching control, and showing its cooperable relation to the control of the car.

Having reference to the drawings, like numerals refer to like parts throughout the several views, and the numeral 1 refers to an automobile, preferably of the truck variety, as shown in Fig. 1, which shows a spraying outfit 2, comprising a tank 3, and an air compressor 4, mounted thereon.

Within the automobile and mounted thereon, in the usual manner, is an engine 5, having the usual crank shaft 6, the engine being supported (in a manner not shown) on the frames 7, of said automobile.

While an automobile is described and will be alluded to as such in these specifications, it is obvious that this invention may be attached to other engines and hence is not restricted to this particular engine alone.

Attached to the front end of said frame is a hanger 8, mounted thereon by bolts 9, the hanger consisting of a laterally positioned bar having an upwardly extending arm 10, in which is contained preferably a self aligning anti-friction bearing 11.

A shaft 12, is rotatably mounted in the bearings and contains on its inner end a coupling means 13, engageable with the crank shaft 6, of the engine, and this coupling means is designed for flexibility between the engine and the power take off to provide for a movement of the frame not strictly in harmony with the movement of the engine as the automobile is moving over the ground.

The coupling comprises a hollow fan pulley 14, engaged to take the place of the original fan pulley, and this hollow fan pulley is secured to the crank shaft of the engine by means of the usual pin 15, in the usual manner. The hollow fan pulley is provided with pockets 16, containing a resilient material 17, which may be of the nature of rubber or of a similar material, rigidly secured in these pockets against a movement other than with the pulley in its rotation with said shaft 6.

Complemental to the pulley is a sleeve 18, mounted on the shaft 12, by means of a set screw 19, and this sleeve carries studs 20, that are designed to engage complemental seats formed in this resilient material. By this means the inertia of the take off mechanism may be overcome without shock as the engine 5, is started, the shock being provided for in the resilient material.

A counter shaft 21, is mounted in the hanger with one of its ends 22, supported by a journal bearing 23, while the end 24, is supported in the bearing mounted in the upwardly extending arm of the hanger 8.

The shaft 12, is restrained from longitudinal movement by means of a collar 25, and a flange 26, the latter maintaining the bearing 11, in the hanger by means of the shoulder 27, thereof.

Mounted on the outer end of the shaft is a clutch mechanism 28, which is operably inter-positioned between the shaft 12, and the counter shaft 21, and this clutch mechanism comprises a shell 29, rigidly secured to the shaft by a set screw 30, with a flange 31, rigidly secured to a sleeve 32, upon which is mounted a grooved wheel 33, which in turn is rigidly secured to a similar grooved wheel 34, mounted within shell 29, by means of rods 35, whereby the movement of the wheel 33, will afford an accompanying movement to the wheel 34.

Slidably mounted on the flange 31, and at points diametrically positioned are shoes 36, carrying a brake lining 37, engageable with the flange of said shell 29. Arms 38, are hingedly attached to the shoes, and are loosely engaged by the grooved wheel 34, in a manner that by withdrawing the grooved wheel 33, the brake lining will be forced against the shell in a manner that the flange will be rotated with the shaft 12, as it in turn is rotated by the engine 5.

Mounted on the sleeve 32, is a sprocket wheel 39, engaged to rotate with the clutch mechanism, and on the end 24, of the counter shaft is secured a complemental sprocket wheel 40, and the sprocket chain belt 41, forms a means of operably connecting the shaft 12, and the counter shaft 21.

Mounted on the hanger is a bracket 42, in which is operably mounted a hand lever 43, wherewith to operate the grooved wheel 33, to engage or disengage locally the clutch mechanism. Attached to and extending from the hand lever is an extension piece 44, in which is mounted a rearwardly extending rod 45, that is designed to terminate in the cab 46, where it is suitably connected with the operating lever 47, that consists of a channeled upright 48, movably attached to a quadrant 49, by means of a pivot 50, and containing a rod 51, slidably mounted in said upright and carrying a dog 52, engaging the notches 53, of said quadrant; the latter being suitably secured to the toeboard 54, of the car and positioned adjacent to the controls 55, which are operably engaged thereby by means of a trigger 56.

The trigger forms a means by which to movably secure the extending rod 45, although it is understood that this rod may be connected to the operating lever in any suitable manner.

The control 55, consists of the usual foot lever which when thrown forward engages the engine with the traction mechanism of the car in "low" and the trigger 56 contacts the foot lever to provide for advancement of that member as the lever 47 is advanced, but leaving the foot lever free to be advanced by the foot of the operator without affecting the lever 47.

The movement of the foot lever irrespective of the lever 47, and without interfering with the trigger 56 is provided for by the relative positions of the pivotal points of the two levers whereby the pedal raises over and becomes free of the trigger in its movement alone. By this arrangement it will be noted that with the clutch disengaged i. e. when the lever 47 is in the erect position the movement of this control is uphampered, but that by the forward movement of the operating lever to engage the clutch that the foot lever is simultaneously moved forward when the traction mechanism is engaged, and the car will then move in low gear. The operating lever is maintained in the desired position by the dog 52, which will maintain the control likewise in the operating position without manual assistance. It is obvious that by temporary removal of the trigger 56, or by sliding the control from the end of said trigger, (there usually being enough side play to accomplish this without inconvenience) the clutch mechanism may be engaged without engaging the traction mechanism of the car.

The counter shaft may be provided as shown with a sprocket wheel 57, and a pulley wheel 58; the sprocket wheel in this case operating the air compressor 4, by the chain bearing 59 as shown in Fig. 1.

It is obvious that gears or pulleys or sprocket wheels may be mounted upon the counter shaft for use as desired, and a clutch 60, may be inter-positioned between the counter shaft and the driving means of the air compressor; or a clutch, not shown, may be mounted on the counter shaft in a manner that may disengage the air compressor while the power is desired for other purposes.

Positioned adjacent to the cab 46, to be properly protected thereby, is a governor 61, of the usual ball and spring leaf variety; the governor having attached to and extending therefrom a grooved wheel 62, that is operated longitudinally of the counter shaft by said governor, and which is positioned opposite the intake manifold 63, of the engine, in the latter of which is mounted an auxiliary butterfly valve 64, which in turn is suitably attached to a stem 65, that extends outward from said manifold to terminate in the sleeve 66, having a shoulder 67, between which and the manifold is interposed a spring 68, that is engaged normally to maintain the butterfly valve in the open position within said manifold, and operably connected in this sleeve 66, and detachably attached thereto by means of a cotter pin 69, or other suitable means, is a connecting rod 70, that extends laterally across the frame 7, on which it is supported by a bracket 71, from whence it extends outward to a position directly above the grooved wheel 62 of the governor 61, there terminating a depending arm 72, to which is preferably attached a roller 73, movably seated in the groove 74, of said grooved wheel 62.

From this it is obvious that the operation of the governor, causes the grooved wheel to slide longitudinally on the shaft, and this movement will cause a rocking movement of the rod 70, by moving the depending arm 72 with a rocking movement, when the butterfly valve will be operated in the usual manner in the manifold and thus control the flow of gas therethrough and by this operation thus control the speed of the engine.

It will also be noted that a means is thus provided whereby power may be taken from the engine of an automobile. The power may be engaged or disengaged from the cab of said automobile or from a point adjacent to the front end of the mechanism as desired; that the power may be obtained with the plant stationary by engaging the control; that the speed of the take off can be regulated whether the plant is movable or stationary; that the device can be removed therefrom, and that attaching thereto or removing therefrom does not require any alterations or changes that might interfere with the operativeness of the engine.

In use, where the device is used for spraying, it is now obvious that with the stationary plant, power may be communicated to the spray outfit and large areas would be cared for in the usual manner. At the same time where spraying is done as through orchards of small trees, through vineyards, or through rows of berry bushes and the like, or for spraying soil for wire or other worms, requiring the covering of a great deal of territory, and a relatively short period of time in any particular spot, that it is very desirable to have a device that may be moved continuously, and it is therefore obvious that with this device, and particularly where there are tracks left by plowing or cultivating whereby careful steering of an automobile is not a requisite, that the driver or operator of the car will be free to observe the action of the spray, or may carry a nozzle to operate in conjunction with a fixed nozzle, both of which are deemed unnecessary to show as they are old in the art, may be carried on by the driver without additional assistance.

With a stationary power plant, white washing and the like may be done, or power may be communicated from the take off mechanism to operate machinery for fanning and treating wheat, or a hoist for loading wheat upon a truck, and its application is universal whether the plant is stationary or moving.

Having thus described my invention, I claim—

1. In a power take off mechanism, a frame, a hanger mounted on said frame and arranged to mount anti-friction bearings, a shaft rotatably mounted in said hanger and provided with a flexible coupling attachable to the crank shaft of an engine, and provided with clutch mechanism, a counter shaft operated in said hanger, means for operating said clutch mechanism simultaneously with the control of said engine, means operably connecting said shaft and said counter shaft, an auxiliary butterfly valve positioned within the intake manifold of said engine, a governor mounted on said counter shaft and detachably attached to said butterfly valve, and means to frictionally secure said butterfly valve in an open position when said governor is detached therefrom.

2. In a power take off mechanism, a frame, a hanger mounted on said frame and provided with an upwardly extending arm, said arm and hanger containing self aligning bearings, a shaft rotatably mounted in said hanger and provided with a flexible coupling, said coupling comprising a hollow fan pulley secured to the crank shaft of an engine, and containing a resilient material rigidly secured therein, and a male portion rigidly secured to said shaft and provided with studs engageable with said resilient material, a counter shaft operably mounted in said hanger, in the upwardly extending arm thereof, a clutch mechanism mounted on said shaft and operably interposed between said shaft and said counter shaft, means for simultaneously operating said clutch mechanism and the controls of said engine, said means comprising an extended rod attached to an operating lever, said lever being positioned adjacent to said control and carrying a trigger operably engaging said control, means for operably connecting said shaft and said counter shaft, an auxiliary butterfly valve positioned within the intake manifold of said engine, a governor mounted on said counter shaft and detachably attached to said butterfly valve, and means to frictionally secure said butterfly valve in an open position when said governor is detached therefrom.

In testimony whereof I affix my signature.

THOMAS A. JONES.